March 27, 1934.  J. FLAMMANG ET AL  1,952,199
MOLDING MACHINE
Filed April 29, 1931   5 Sheets-Sheet 1
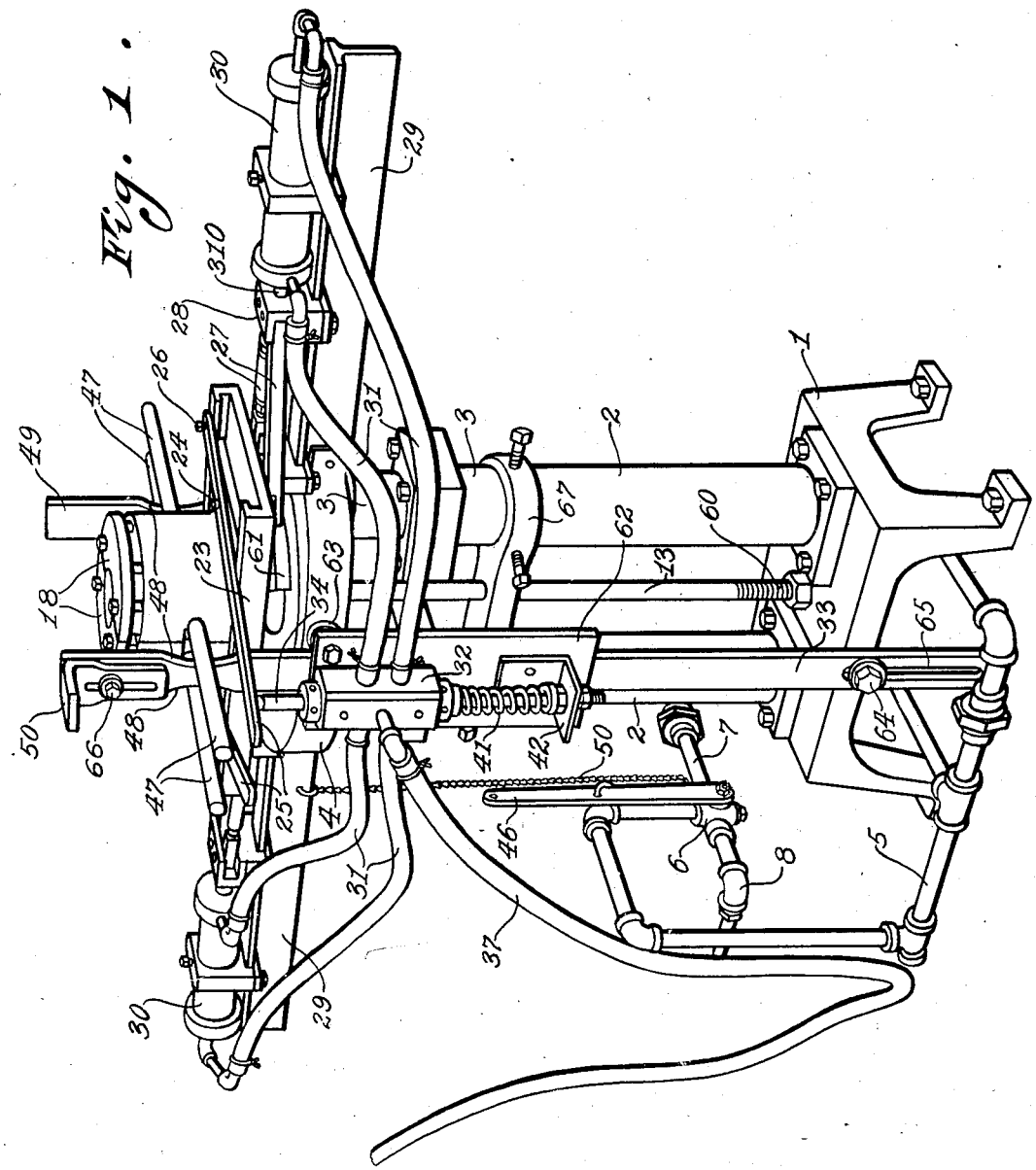
Inventors:
JOHN FLAMMANG AND PERCY L. BOWSER,
By John N. Bruninga
Their Attorney.

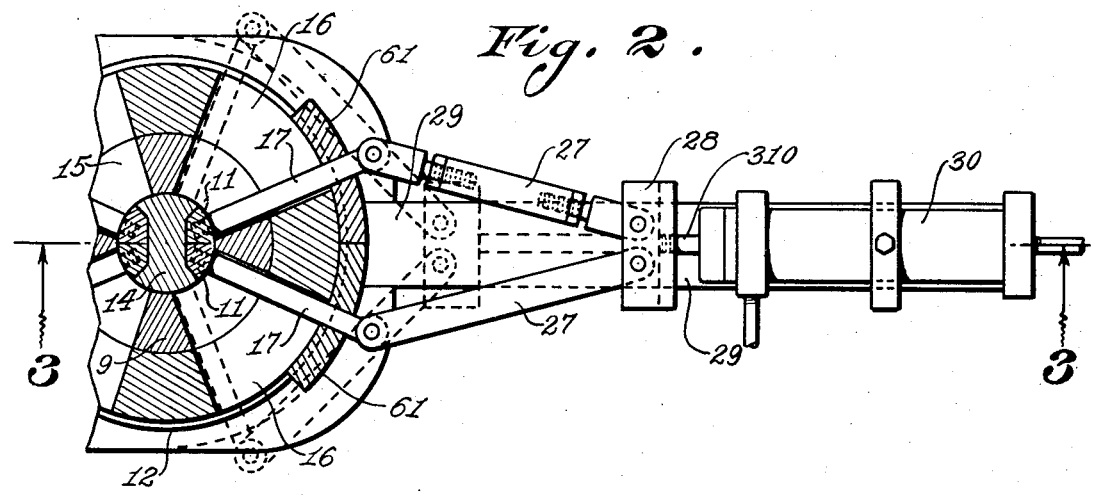
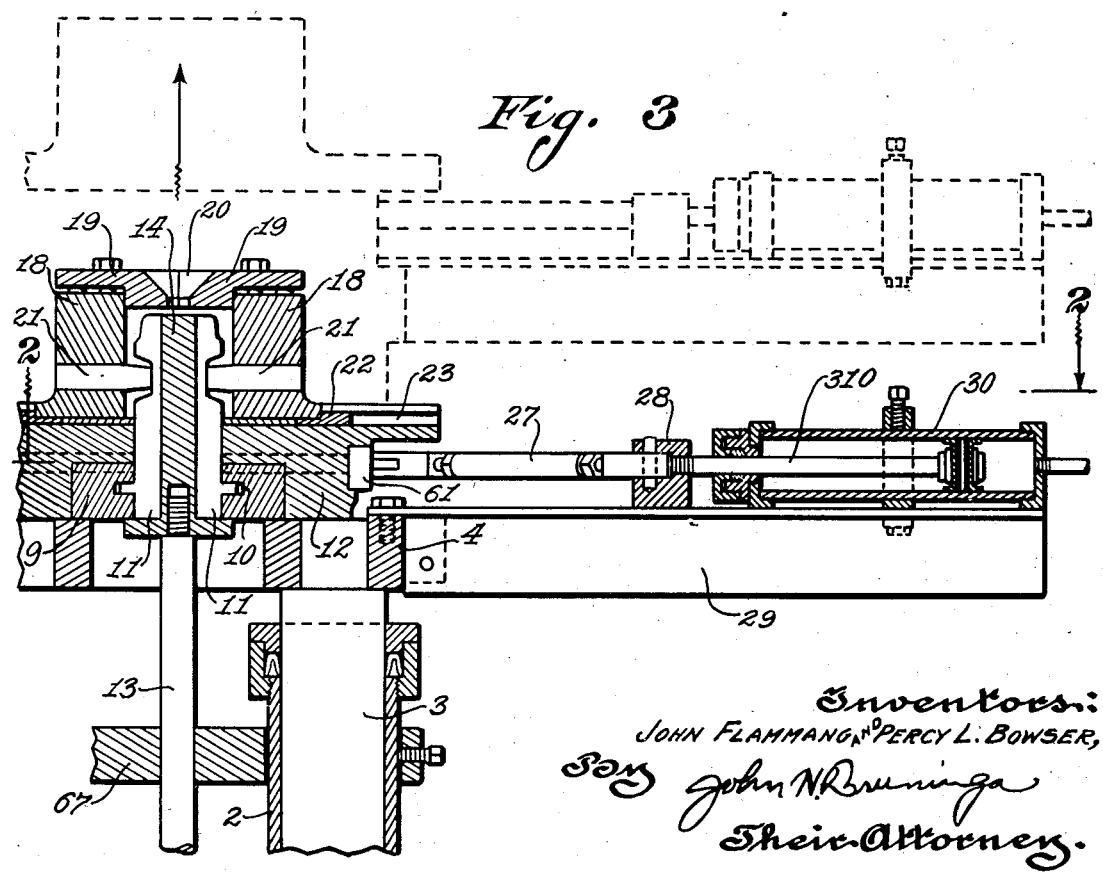

March 27, 1934.    J. FLAMMANG ET AL    1,952,199
MOLDING MACHINE
Filed April 29, 1931    5 Sheets-Sheet 3

Inventors:
John Flammang and Percy L. Bowser,
By John N Brumunga
Their Attorney.

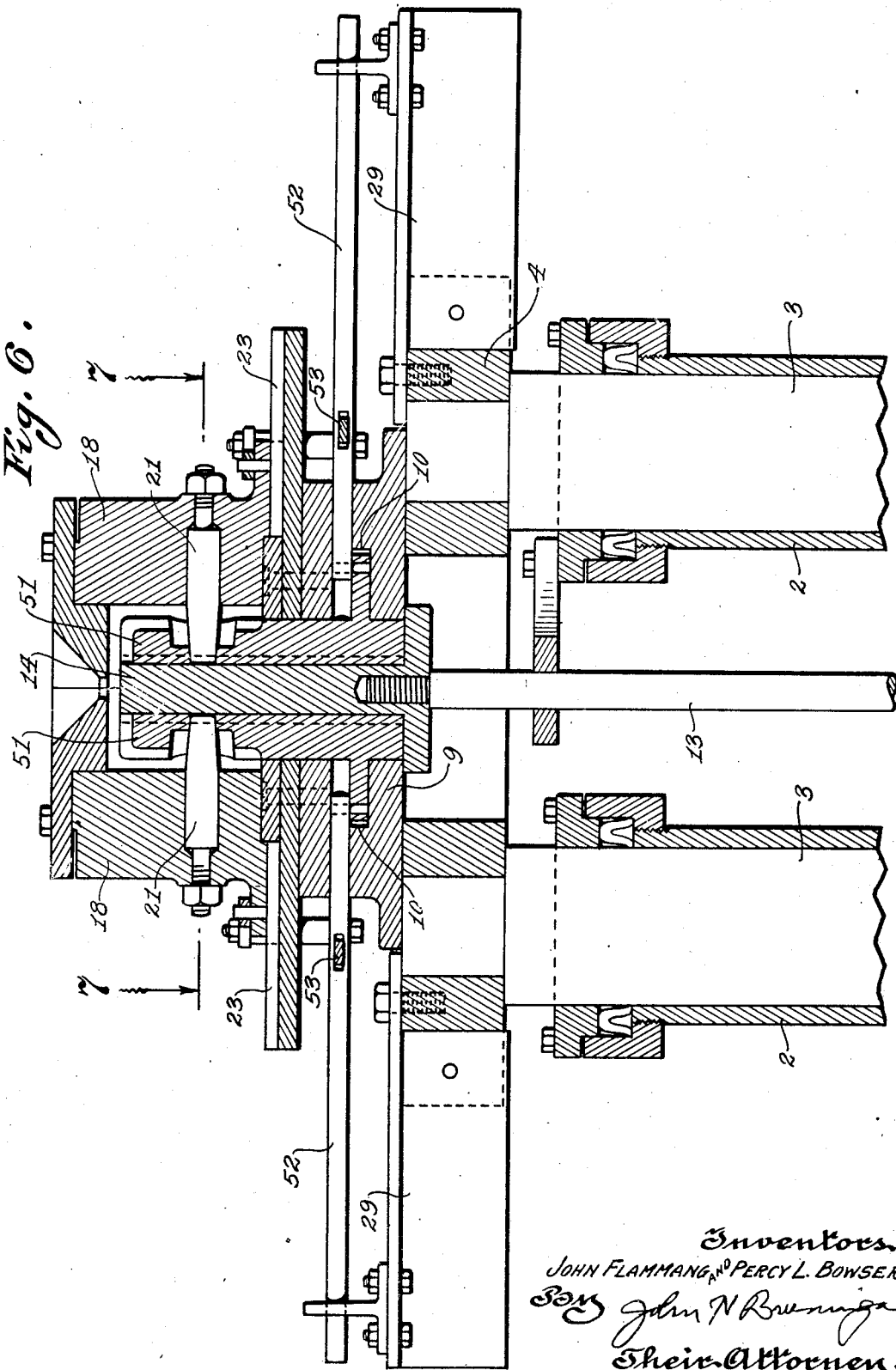

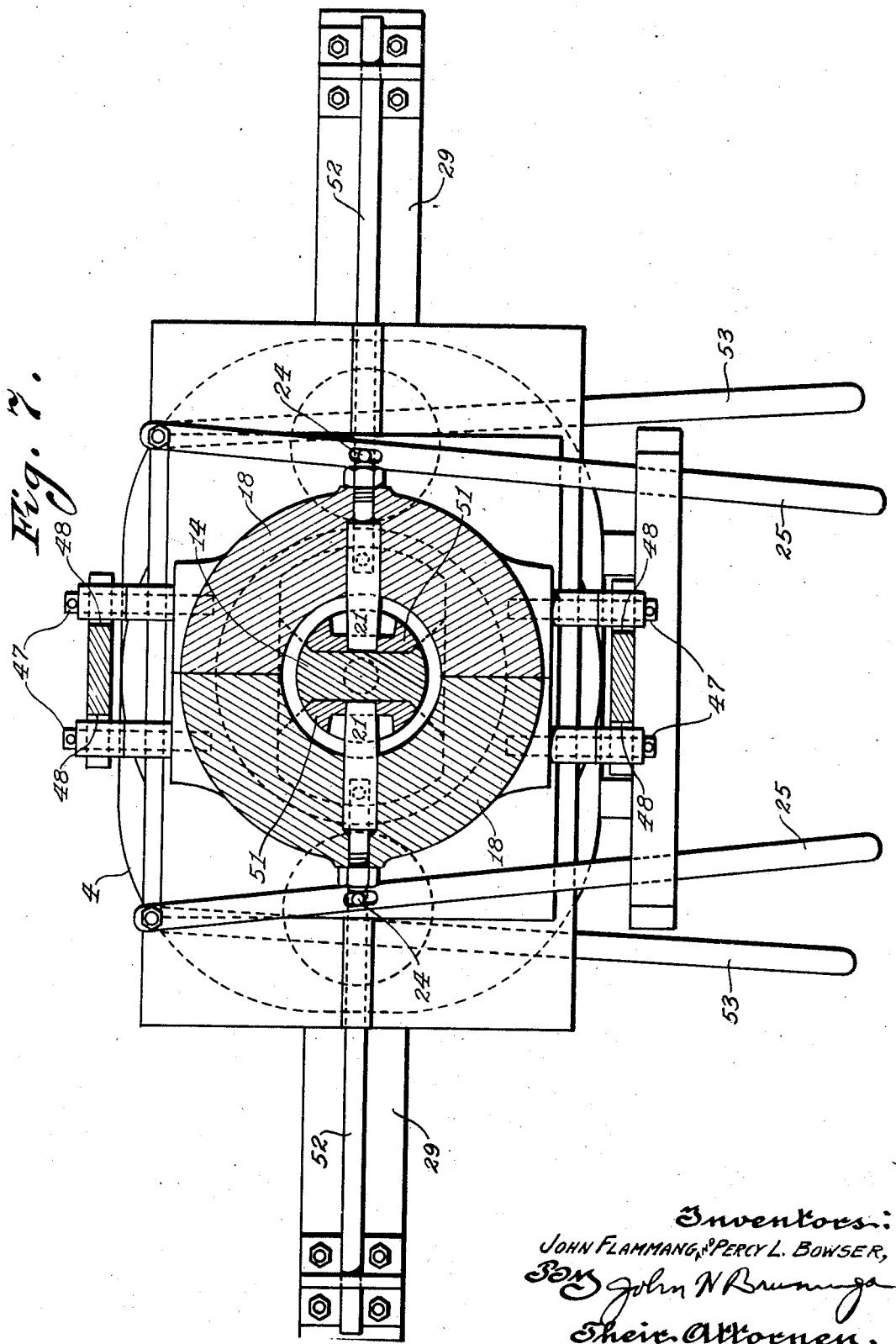

Patented Mar. 27, 1934

1,952,199

UNITED STATES PATENT OFFICE 1,952,199

MOLDING MACHINE

John Flammang and Percy L. Bowser, St. Louis, Mo., assignors to The Sterling Corporation, St. Louis, Mo., a corporation of Delaware Application April 29, 1931, Serial No. 533,670

14 Claims. (Cl. 22—93)

This invention pertains to molding machines and more particularly to machines for molding trunk pistons such as are used in internal combustion engines.

One of the objects of this invention is to provide a machine for molding pistons and the like by which the finished casting may be freed from the mold in a simple and rapid manner.

Another object is to provide a machine which will automatically free the casting from the mold.

Another object is to provide a machine which will free the casting and which will support the free casting in a position easily accessible for removal.

Another object is to provide such a machine with means for facilitating the separation of the casting from the mold or core parts.

Further objects will appear from the following description taken in connection with the accompanying drawings, in which Fig. 1 is a perspective view of a machine embodying this invention.

Fig. 2 is a horizontal section of part of the machine of Fig. 1 taken on line 2—2 of Fig. 3.

Fig. 3 is a section on line 3—3 of Fig. 2.

Fig. 6 is a longitudinal vertical section of a machine showing another embodiment of this invention.

Fig. 7 is a horizontal section of the machine of Fig. 6 taken on line 7—7 of Fig. 6.

Figure 4:
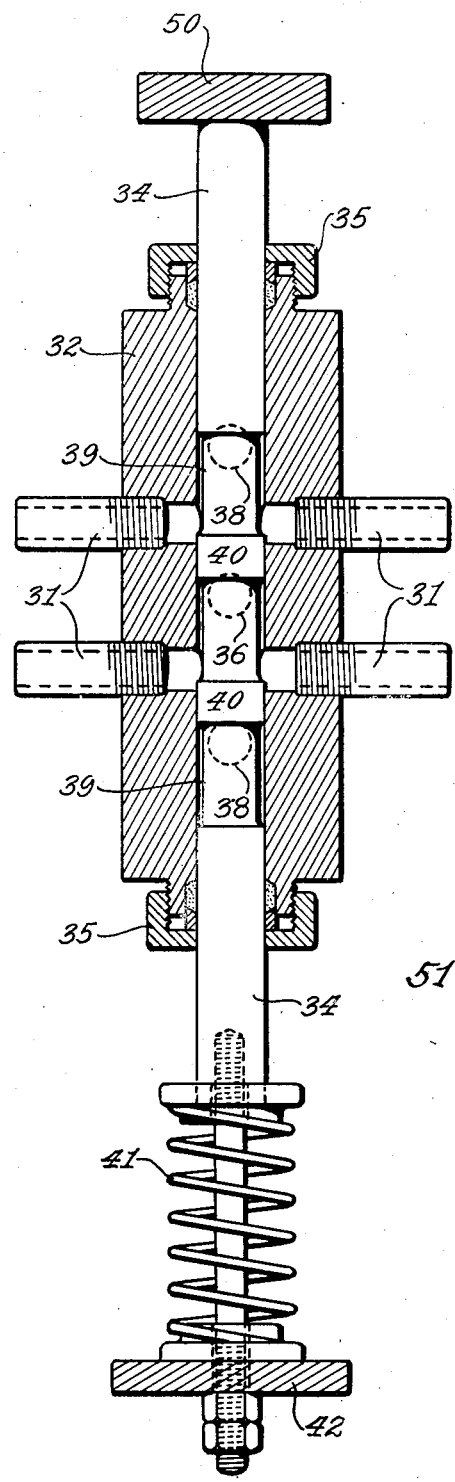
Fig. 4 is an enlarged vertical sectional detail of the automatic air valve.

Referring now to the drawings and more particularly to Figs. 1 to 5 inclusive, Fig. 1 illustrates a machine in which most of the core freeing movements are carried out automatically. In these drawings, 1 designates a base or pedestal which carries a pair of hydraulic cylinders 2. Each of these cylinders has a plunger 3. Mounted on the upper ends of the plungers 3 is a table 4 which carries the molding devices. A system of pipes 5 controlled by a valve 6 is arranged to supply water or other hydraulic medium to the cylinders from a pressure supply 7, or to exhaust the medium therefrom to an exhaust or waste pipe 8 in accordance with the operation of the valve 6.

Mounted on the table 4 is a split ring 9 having an internal annular groove 10 adapted to receive outstanding sector flanges of a series of, (in this case four), core parts 11 which are held thereby within the ring 9 but so as to be movable circumferentially within the ring. An outer split ring 12 surrounding the ring 9 and bolted on the table holds the ring 9 in an assembled relation. Mounted on a rod 13 upstanding from the base 1 and adjustable therein by a threaded connection 60 is a central core part 14 adapted to fit between the core parts 11 so as to complete the core which forms the interior surface of a piston. This rod 13 is firmly held by passing through a cross piece 67 connecting the cylinders 2.

The rings 9 and 12 are provided with sector slots 15 and 16 respectively, and each core part 11 has secured thereto an arm 17 extending radially therefrom through the slots 15 and 16 so as to provide for manipulating said part as will presently be described. Sector plates 61 on the arms 17 engage the outer face of the ring 12.

Mounted on top of the ring 9 is a pair of mold halves 18 comprising semi-circular portions adapted to fit together over the core formed by the parts 11 and 14 in order to form the outside of the piston. The parts 18 each have secured thereto a half portion 19 of a split cap forming the upper part of the mold cavity and provided with a flaring gate 20 for pouring in the metal. Each mold half 18 is provided with a pin 21 projecting inwardly thereof, to form a core for one of the wrist pin bosses the cavity for which is formed in adjacent core parts 11.

Each mold half 18 has a plate 22 adapted to move in radially extending guides 23 mounted on the ring 12. This provides for moving the mold halves 18 radially outwardly and axially of the pins 21 so as to separate the same in order to free the casting. The plate 22 has pivoted thereto at 24 a hand lever 25 which is pivoted at its end at 26 to the guide 23. By manipulation of the levers 25, the mold halves may be moved in and out in the ways 23.

In order to provide for moving the core parts 11 out of the way of the wrist pin bosses which have been formed thereby on the inside of the piston, the arms 17 have pivoted thereto at their ends a pair of links 27 one or more of which may be adjustable as shown in Fig. 2. The other ends of the links 27 are pivoted to a head 28 guided for movement along a rail 29 extending radially from the table 4. There are two such rails extending in opposite directions from the table and each carrying at its end a pneumatic cylinder 30. The plunger rod 310 of this cylinder is attached to the head 28 so that by supplying air to one side or the other of the cylinder 30 the head 28 may be forced in or out along the rail 29. This movement of the head 28 causes the links 27 acting through the arms 17 to swing the core parts 11 from the molding position to free position or vice versa.

Tube connections 31 connect the opposite ends of the cylinder 30 with an automatic valve 32 mounted on an upright panel 62 attached to the table 4 and sliding over a bar 33 in front of the machine. The bolts securing the panel pass through rollers 63 sliding on the bar and the latter is adjustably mounted on the base by a screw 64 engaging a slot 65.

The construction of the valve 32 is illustrated in Fig. 4. The tube connections 31 enter at the side of the valve as illustrated and ports from these connections communicate with a central longitudinal port extending the entire length of the valve. A control rod 34 passes through the central port of the valve which is closed at its ends by stuffing boxes 35. Between the upper and lower ports leading to the connections 31 an inlet port 36 enters the central bore of the valve. This port is connected by a tubular connection 37 with any suitable source of compressed air or the like not shown in the drawings. Above and below the ports leading to the connections 31 are exhaust ports 38 connecting the interior bore of the valve 30 with the outer atmosphere.

The rod 34 is formed with a series of reduced portions 39 as shown in Fig. 4 leaving between said reduced portions a pair of plugs or pistons 40. The lower end of the rod 34 rests upon a spring 41 bearing against a bracket 42 so as to maintain the rod 34 yieldingly in its uppermost position. In Fig. 4 the rod 34 is shown depressed so that the plugs 40 are below the ports leading to the connections 31. In this position the lower connections are in communication with the compressed air supply 36 while the upper connections controlling the inner ends of the cylinders 30 are in communication with the exhaust port 38. Under normal conditions the plugs 40 stand above the ports leading to the connections 31 so that the upper pair of connections controlling the inner ends of the cylinders 30 are in communication with the sources of air pressure 36 while the lower connections are in communication with the exhaust. In this condition the cylinders 31 hold their plungers retracted in the positions shown in Figs. 2 and 3.

Figure 5:
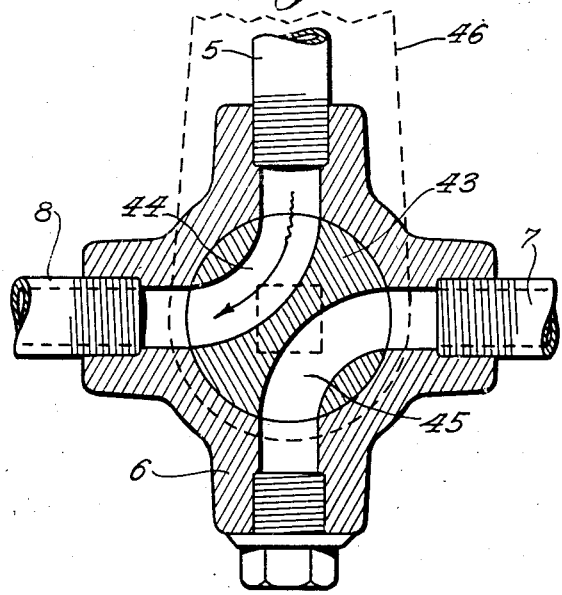
Fig. 5 is a sectional detail of the control valve.

The valve 6 is constructed as illustrated in Fig. 5 its movable element 43 has two ports 44 and 45 and is provided with a manipulating handle 46 by which it may be turned through a 90° angle. In the position shown in Fig. 5, the system of piping 5 is connected with the exhaust pipe 8. If the handle 46 is moved to the left 90°, the port 45 will move so as to connect the piping 5 with the supply 7. The mold halves have bars 47, which when the table is in normal depressed position engage recesses 48 in the bar 33 at the front of the machine and a similar bar 49 at the back and similarly mounted for vertical adjustment on the base 1. The upper ends of these recesses provide cam faces for spreading apart the bars 47 and the mold halves connected thereto. The front bar 33 has a stop bracket 50, mounted for adjustment thereon by a screw and slot connection 66, and engaged by the plunger 34.

In normal position, the parts are in the position shown in Fig. 1. The plungers 3 of the hydraulic cylinders 2 are retracted so that the table 4 is in its lowermost position. The plungers of the cylinders 30 are retracted so that the core parts 11 stand in the position shown in Fig. 2 with the core element 14 between them shown in Fig. 3. The mold halves 18 are at this time together so as to complete the mold cavity. The casting metal may now be poured into the mold through the gate 20. As soon as the metal has set the operator pulls the handle 46 forwardly so as to operate the valve 6 to admit pressure fluid from the supply 7 to the hydraulic cylinders 2. Under the pressure of this fluid the latter immediately force the plungers 3 upwardly so as to raise the table 4. During this movement the central core part 14 remains stationary, being mounted on the rod 13 fixed to the base. Accordingly the mold and the core parts 11 are lifted clear of the core part 14. In the normal position of the parts as shown in Fig. 1, bars 47 extending outwardly from the mold halves 18 are positioned within recesses 48 in bars 33 and 49. As the table is lifted, bars 47 engage the cam faces of the recesses 48 and are forced apart, thereby breaking the mold halves 18 from the casting. As the movement continues the valve 32 which is secured to the table 4 so as to rise therewith, has its plunger 34 brought into engagement with the stop 50, thereby forcing the plunger 34 downwardly to operate the valve 32 so as to exhaust the air from the inner ends of the cylinders 30 and supply pressure to the outer ends thereof. Thereupon the heads 28 are forced inwardly so as to swing the arms 17 and the core parts 11 inwardly to such a position that they are clear of the wrist pin bosses within the casting.

The plungers 3 and the parts carried thereby will continue their upward movement until the chain 50 connecting the table with the handle 46 becomes taut and shifts the valve 43 to neutral position; this causes the table to come to rest in raised position. At that time, the casting is entirely free from the mold both within and without. The operator will now move the handles 25 outwardly so as to carry the mold halves 18 far enough away from the casting to permit the use of a pair of tongs for lifting the casting from the mold. In order to drop the table, the operator shifts the handle 46 to exhaust position; this automatically restores the core parts, while the mold parts can be restored by manipulation of the handles 25.

It will be noted that in this machine, the mold is held in a depressed position during the casting operation so that the same may be easily filled with a hand ladle or otherwise. The upward movement of the table then raises the casting so that when it has been freed of the mold it is in a convenient position for examination for the discovery of flaws and for grasping the same in order to move it from the mold.

In the embodiment of Figs. 6 and 7, automatic means for manipulating the mold and the core parts are dispensed with and the core construction is varied. In this embodiment the core is made up of a central element 14 identical with that previously described. The side members of the core, however, instead of being sub-divided as in Figs. 2 and 3 to form a five-part core, are each formed of a single section 51 as illustrated in Figs. 6 and 7 so as to form together with the central part a three-part core. In this case in order to free the core parts from the casting, the parts 51 are moved toward each other axially of the pins 21 to the center of the mold instead of the quarters being swung circumferentially as in the other embodiment. During this movement the sections 51 are guided in the groove 10 which, in this case, takes the form of an elongated slot extending axially of the core pins 21 and providing a core guide for the sections 51. In the embodiment shown, the core parts 51 are connected to rods 52 which are pivoted to manipulate handles 53 operating in a manner similar to that described for the handles 25. This movement may, of course, be carried out by the pneumatic cylinders 30. In such a case the rods 52 can connect directly with the heads 28. Fig. 1, while the connections 31 to the ends of the cylinder can remain as heretofore described. In either manual or pneumatic construction, the retracting of the center core part 14 will permit inward movement of parts 51 sufficiently to clear the wrist pin bosses of the casting.

Figure 8:
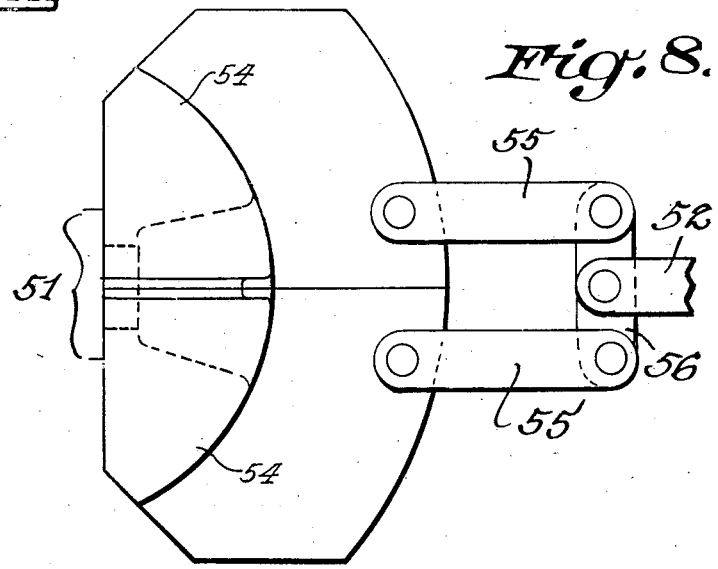
Fig. 8 is a detail showing the construction of some of the core parts of the machine of Figs. 6 and 7.

One objection which is, however, encountered with such a core is due to the fact that it does not readily release from the casting and more particularly from the wrist pin boss. In order to overcome this difficulty and assist in breaking the core parts 51 from the casting and also to avoid binding of the same during the freeing movement, these core parts are constructed as in Fig. 8. In this case, each core part is divided into two halves 54, and each half is connected by a link 55 to an equalizer 56 whose middle point is connected with the actuator rod 52. This construction provides flexibility in this divided core part so that when the actuator 52 is operated a slight relative movement between the parts 54 may permit the same to twist slightly and thereby be more easily broken away from the casting as well as preventing binding.

While this device has been described as a unitary machine, it is obvious, of course, that certain features or sub-combinations thereof are useful and may be employed without reference to other features, and that the use of such sub-combinations is contemplated by this invention and is within the scope of the appended claims. It is further obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In a piston molding machine, a support, a sectional molding device thereon, power-operated means for moving said support, power-operated means for separating the sections of said device to free the casting, and an automatic device set to actuate said separating means when said support approaches the end of its movement.

2. In a piston molding machine, a support, a sectional molding device thereon, power-operated means for moving said support, fluid-operated means for separating the sections of said device to free the casting, and an automatic valve controlling said fluid-operated means.

3. In a piston molding machine, a support, a sectional molding device thereon, power-operated means for moving said support, a fluid-operated means for separating the sections of said device to free the casting, an automatic valve controlling said separating means, and an adjustable stop for operating said valve.

4. A piston molding machine, comprising, a support, a plurality of core sections guided for movement on said support to assembled and disassembled relations, a core section mounted independently of said support and cooperating with said first sections to complete the core, a split mold taking over the core and completing the mold cavity, power-operated means adapted to carry said first core sections clear of said independent section, means for collapsing said first sections, and means for separating the parts of said mold to expose the casting.

5. In a piston molding machine, a sectional core comprising, a series of sections adapted to form the inside of the casting, one of said sections being composed of separable parts adapted to form a laterally extending part inside of the casting, another section being adapted for longitudinal withdrawal to clear said first section, means for guiding said first section for movement along said laterally extending part and into the space cleared by withdrawal of said second section, an actuator for moving said first section, and means flexibly connecting said actuator with said separable parts of said first section.

6. A piston molding machine, comprising, a core composed of sections including a lateral section adapted to form a laterally extending part inside of the casting and an adjoining section, and mechanism connected with said sections and operating automatically to first withdraw said adjoining section and to thereafter move said lateral section into the space cleared by the withdrawal of said adjoining section.

7. A piston molding machine, comprising, a mold composed of sections, a core cooperating therewith, means engaging said mold sections to separate them on relative movement of the mold sections and said means to positively break the mold sections apart, and means for withdrawing said core from the casting.

8. A piston molding machine, comprising, a mold composed of sections, a core composed of sections, mechanism connected with said mold and core sections to move the mold and core sections apart, and controlling means for said mechanism adapted to cause the same to move said mold sections apart and to move the center core section and thereafter move the remaining core sections to free the casting.

9. A piston molding machine, comprising, a mold composed of sections, a core composed of sections including a lateral section adapted to form a laterally extending part inside of the casting and an adjoining section, mechanism connected with said mold and core sections, and a controlling device adapted to cause said mechanism to move said mold sections apart and to move said adjoining section and thereafter to move said lateral section in order to free the casting.

10. In a piston molding machine, a mold, a sectional core therefor including a side section adapted to form a laterally extending part inside the casting, and a core section guide, said side section being slidable in said guide along said laterally extending part to clear the casting.

11. In a piston molding machine, a core section composed of separable parts, an actuator, and means flexibly connecting said parts to each other and to said actuator securing said parts together to be moved by said actuator as a single section while accommodating slight relative movement of said parts.

12. In a piston molding machine, a core section composed of separable parts, means for guiding said parts for movement to clear the casting, an actuator, and means flexibly connecting said parts to each other and to said actuator securing said parts together to be moved by said actuator as a single section while accommodating slight relative movement of said parts.

13. A piston molding machine, comprising, a mold composed of sections, a core composed of sections and cooperating therewith, said mold sections and said core forming a mold cavity for a piston with the head up, said mold sections forming a gate at the top, said core extending upwardly into said mold sections, means engaging said mold sections to separate them on relative movement of the mold sections and said means to positively break the mold sections apart, and means for withdrawing one of said core sections downwardly from the casting.

14. In a piston molding machine, a mold, a sectional core therefor including a side section adapted to form a laterally extending part inside the casting, said mold and said core forming a mold cavity for a piston with the head up, said mold having a gate at the top, said core extending upwardly into the mold, and a core section guide, said side section being slidable in said guide along said laterally extending part to clear the casting.

JOHN FLAMMANG.
PERCY L. BOWSER.